United States Patent [19]

Chi

[11] Patent Number: 5,056,238
[45] Date of Patent: Oct. 15, 1991

[54] PAIR OF VERNIER CALIPERS HAVING A PROTRACTOR

[76] Inventor: Yi C. Chi, No. 139-5, An Mei Rd., Mei Shan Village, Taichung Hsien, Taiwan

[21] Appl. No.: 610,357

[22] Filed: Nov. 7, 1990

[51] Int. Cl.[5] .............................................. G01B 3/56
[52] U.S. Cl. ...................................... 33/810; 33/532; 33/783
[58] Field of Search ................. 33/810, 811, 806, 807, 33/808, 809, 783, 784, 501.06, 531, 532, 812, 823, 824, 534

[56] References Cited

U.S. PATENT DOCUMENTS

| 79,032 | 6/1868 | Tierney | 33/532 |
|---|---|---|---|
| 129,349 | 7/1872 | Kellogg | 33/532 |
| 501,807 | 7/1893 | Peterson | 33/532 |
| 735,935 | 8/1903 | Bellings | 33/812 |
| 1,039,901 | 10/1912 | Constantinesco | 33/532 |

FOREIGN PATENT DOCUMENTS

| 97228 | 5/1898 | Fed. Rep. of Germany | 33/810 |
|---|---|---|---|
| 1404787 | 6/1988 | U.S.S.R. | 33/810 |

Primary Examiner—Allan N. Shoap
Assistant Examiner—C. W. Fulton
Attorney, Agent, or Firm—Ross, Howison, Clapp & Korn

[57] ABSTRACT

A pair of vernier calipers includes a shaft. A vernier is slidable along the shaft. A protractor has a base coupled to the vernier. A follower is pivotally coupled on the base. A spring is biased between the follower and the base so as to bias the follower to rotate in one direction relative to the base. A graduation is provided on the follower. A mark is provided on the base. When the vernier is pushed toward an object, the follower is caused to rotate so that a relative movement between the mark and the graduation indicates an angular dimension of the object.

4 Claims, 7 Drawing Sheets

5,056,238

PAIR OF VERNIER CALIPERS HAVING A PROTRACTOR

BACKGROUND OF THE INVENTION

The present invention relates to a vernier calipers, and more particularly to a pair of vernier calipers having a protractor.

The vernier calipers generally includes a vernier slidable along a scale so that the vernier calipers can be provided for measuring a length, a diameter or a width of an object. The vernier calipers can not measure an angular dimension of the object.

The present invention has arisen to mitigate and/or obviate the afore-described disadvantages of the conventional measuring instruments.

SUMMARY OF THE INVENTION

The primary objective of the present invention is to provide a pair of vernier calipers having a protractor for measuring an angular dimension of an object.

In accordance with one aspect of the invention, there is provided a pair of vernier calipers which includes a scale body which is L-shaped and includes an elongated shaft and a leg integrally formed together. A vernier is coupled to the elongated shaft and is slidable along the elongated shaft. An extension is integrally fixed to one end of the vernier close to the leg of the scale body and is parallel to the leg. A protractor which is coupled to a free end of the extension includes a base coupled to the free end of the extension. A pin is fixed on the base and extends upward. A follower has an opening engaged on the pin so that the follower is rotatable about the pin. A spring is biased between the follower and the base so as to bias the follower to rotate in one direction relative to the base. A graduation is provided on an upper edge of the follower. A mark is provided on the base. When the vernier is pushed toward an object, the follower is caused to rotate about the pin so that a relative movement between the mark and the graduation indicates an angular dimension of the object.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
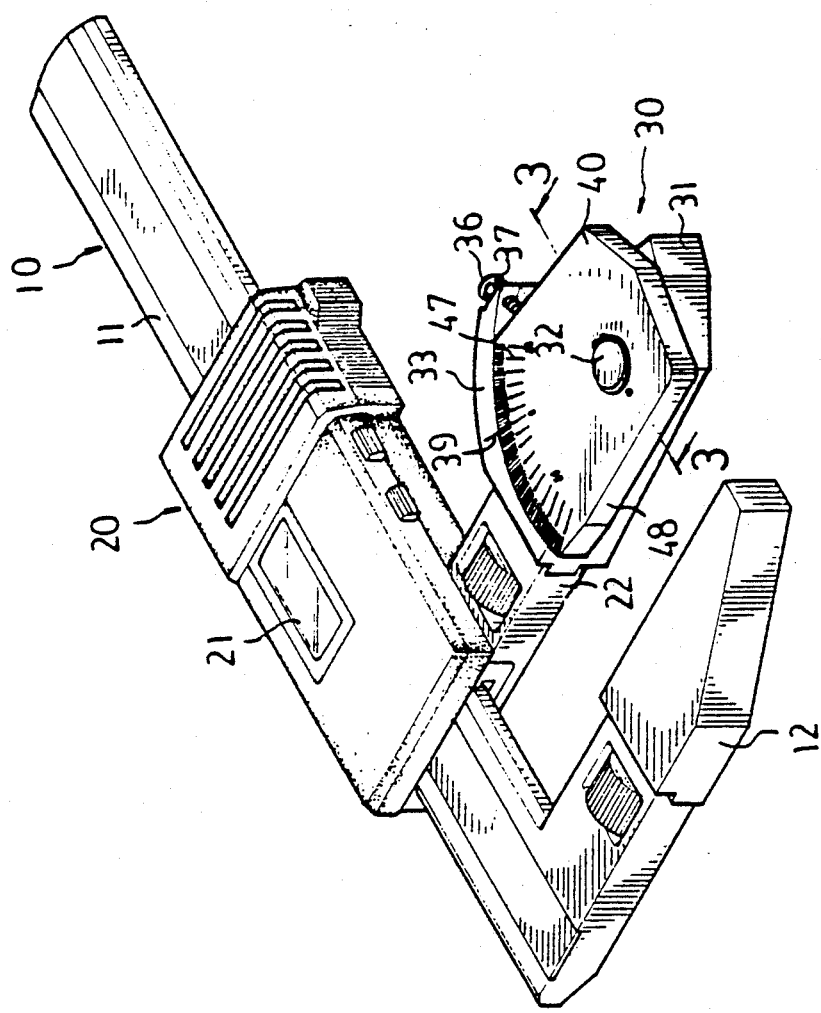
FIG. 1 is a partial perspective view of a pair of vernier calipers having a protractor in accordance with the present invention.
Figure 2:
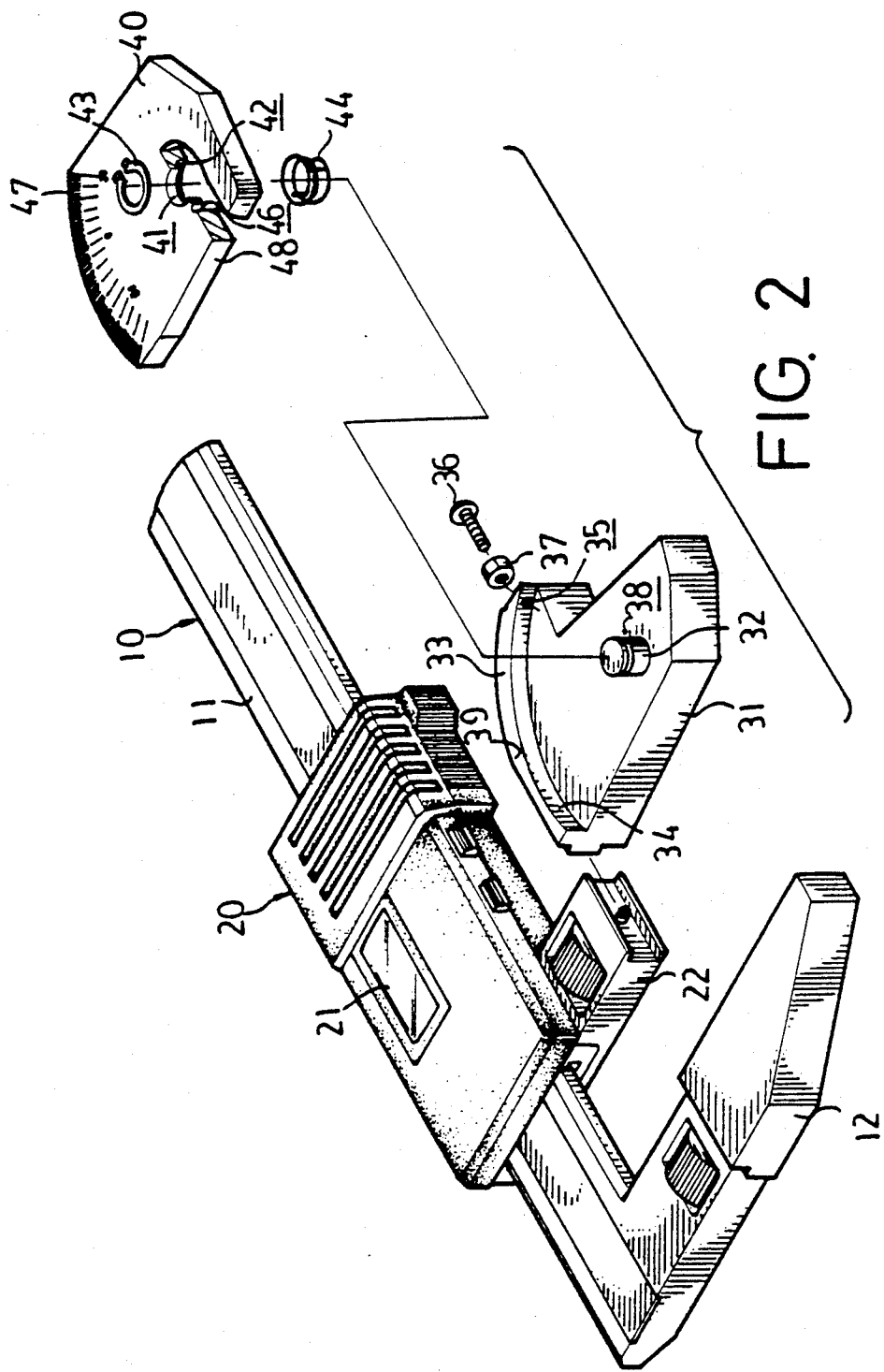
FIG. 2 is an exploded view of the vernier calipers having a protractor.

Referring to the drawings and initially to FIGS. 1 and 2, a pair of vernier calipers having a protractor in accordance with the present invention comprises generally a scale body 10, a vernier 20 slidable along an elongated shaft 11 and a protractor 30 coupled to the vernier 20.

The scale body 10 includes the elongated shaft 11 and a leg 12 integrally formed together to form an L-shape. An extension 22 is integrally formed on the front end of the vernier 20 and is parallel to the leg 12 of the scale body 10. The vernier 20 is generally an electric type vernier with a display 21 provided thereon for showing the distance between the leg 12 of the scale body 10 and the extension 22 so that a width or a length of an object 50 (FIG. 4) can be measured. The electric type vernier 20 is commercially available and is well known in the art so that it will not be described in further details.

The protractor 30 includes a base 31 coupled to the extension 22. A pin 32 is fixed on the lower end of the base 31 and extends upward. A ridge 33 is integrally formed on the upper end of the base 31 and extends upward from the base 31. The ridge 33 has a curved lower surface 34 whose curvature center is located at the center of the pin 32. A screw hole 35 is formed on one end of the ridge 33 opposite to the leg 12 of the scale body 10 for receiving a screw 36. A nut 37 is threadedly engaged on the screw 36 for fixing the screw 36 in place relative to the base 31.

Figure 3:
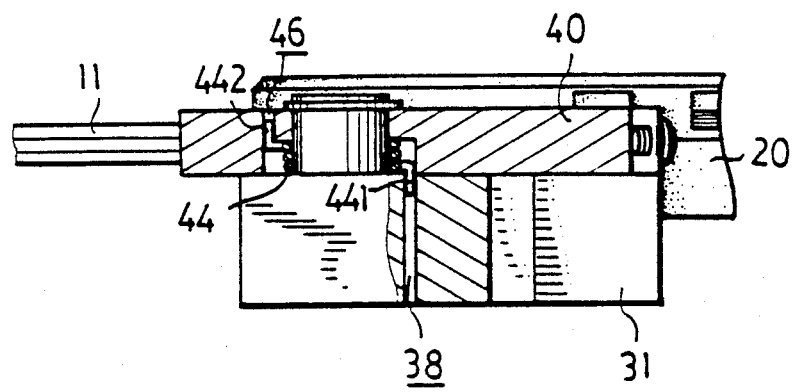
FIG. 3 is a partial cross sectional view taken along lines 3—3 of FIG. 1.
Figure 4:
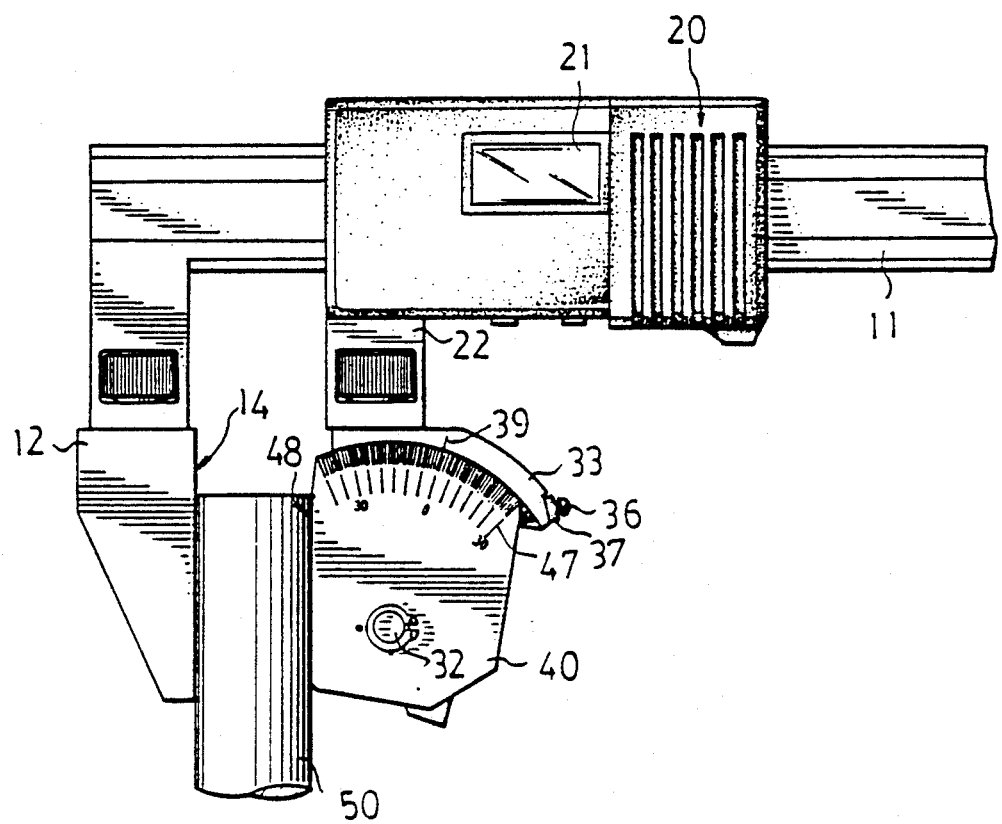
FIG. 4 is a plane view illustrating an operation of the present invention.

A follower 40 has an opening 41 formed therein for engagement with the pin 32 so that the follower 40 is rotatable about the pin 32. A retaining ring 43 is clamped on the upper end of the pin 32 for limiting an axial movement of the follower 40 relative to the base 31. A graduation 47 is provided on the upper end of the upper surface of the follower 40. The upper end of the follower 40 has a curvature equal to that of the lower surface 34 of the ridge 33. An annular recess 42 which is coaxial with the opening 41 is formed on the lower surface of the follower 40. As is best shown in FIG. 3, a coil spring 44 is received within the annular recess 42 of the follower 40. One end 441 of the coil spring 44 is engaged within a hole 38 of the base, and the other end 442 is engaged within a hole 46 of the follower 40 so that, as shown in FIG. 4, the follower 40 is biased to rotate clockwise by the coil spring 44 and so that the upper and right end of the follower 40 contacts the screw 36. A rotation of the screw 36 makes the screw 36 to move relative to the follower 40 so that a "zero degree" indication line of the graduation 47 can be aligned with a mark 39 provided on the ridge 33.

Referring next to FIG. 4, when the "zero degree" line is aligned with the mark 39, the left edge 48 of the follower 40 is parallel to the right edge 14 of the leg 12 so that the width of the object 50 whose opposite sides are parallel can be measured and can be read on the display 21.

Figure 5:
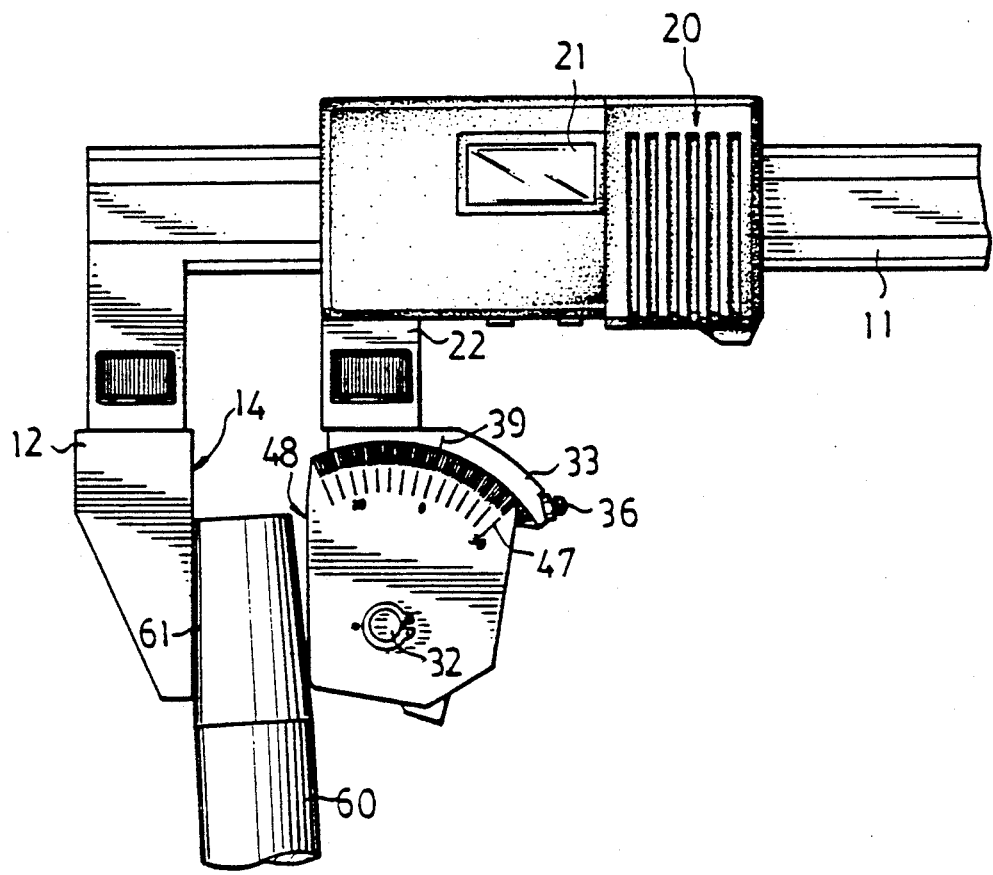
FIGS. 5 and 6 are plane views illustrating a measurement of an angular dimension of an object.
Figure 6:
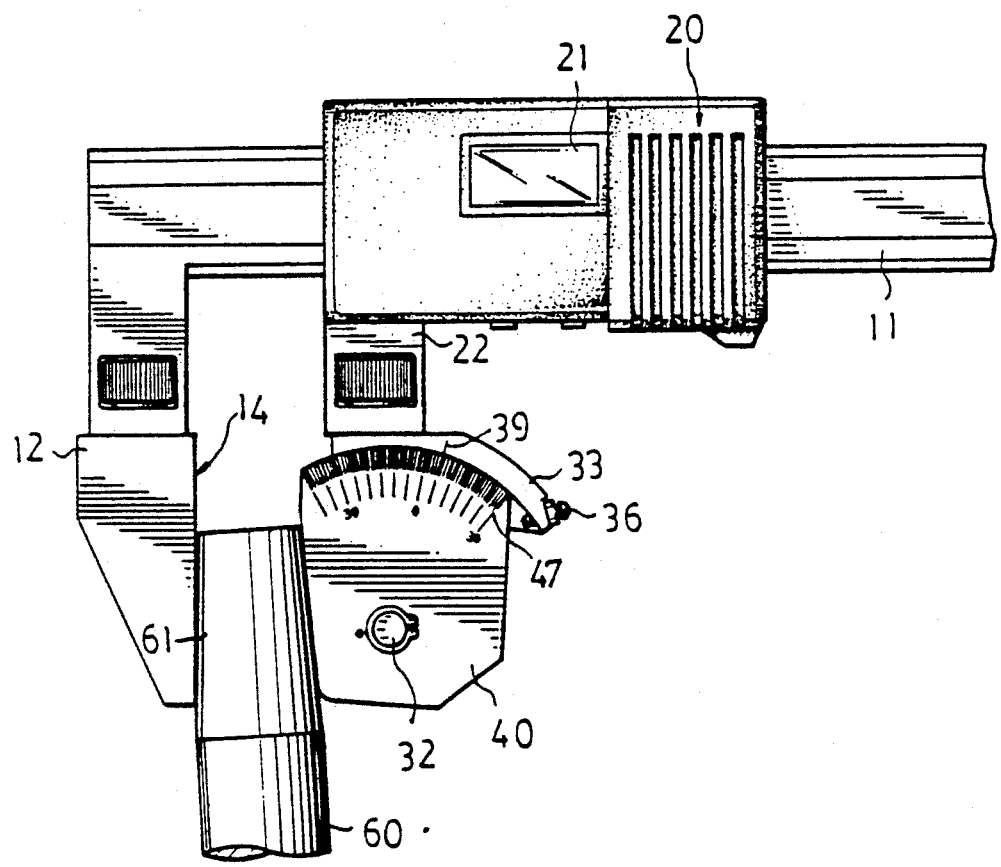

Referring next to FIGS. 5 and 6, when a frustum 61 is formed on one end of an object 60 and when it is desired to measure the angular dimension of the frustum 61, one side of the frustum 61 first contacts the right edge 14 of the leg 12. Move the vernier 20 toward the object 60, the lower portion of the left edge 40 of the follower 40 will contact the object 60 first. At this moment, the graduation 47 still points zero degree (FIG. 5). When the vernier 20 is further pushed forward the object 60, the follower 40 is caused to rotate about the pin 32 until the left edge 48 of the follower 40 bears against the right side of the frustum 61. A relative position between the graduation 47 and the mark 39 indicates the angular dimension of the frustum 61 (FIG. 6). After measurement, the vernier 20 is pushed rightward. The coil spring 44 biases the follower 40 to rotate in a reverse direction to the initial condition as shown in FIG. 5. The angular dimension of the object 60 can be easily measured.

Figure 7:
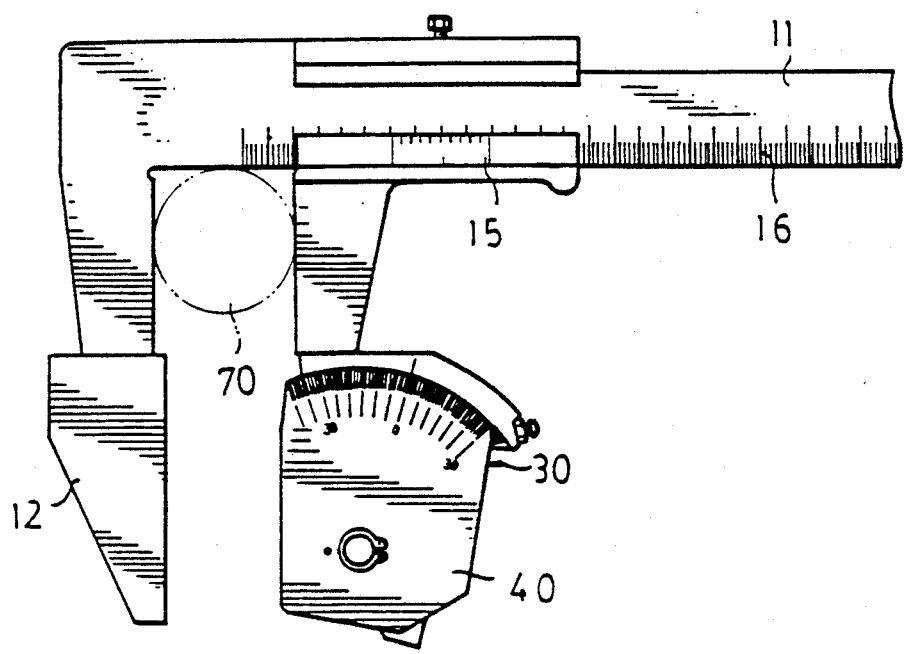
FIG. 7 is a plane view of another application of the vernier calipers.

Referring next to FIG. 7, illustrated is another application of the present invention. As shown in this embodiment, the vernier 15 is a conventional mechanical type vernier. The relative position between the vernier 15 and the graduation 16 of the elongated shaft 11 indicates the diameter of the object 70. The protractor 30 is also capable of measuring an angular dimension of an object similar to that is disclosed above.

Accordingly, the vernier calipers having a protractor in accordance with the present invention is capable of measuring an angular dimension of an object easily.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A pair of vernier calipers comprising:
   a scale body which is L-shaped and includes an elongated shaft and a leg integrally formed together;
   a vernier being coupled to said elongated shaft and being slidable along said elongated shaft, an extension being integrally fixed to one end of said vernier close to said leg of said scale body, said extension being parallel to said leg and movable toward said leg; and
   a protractor being coupled to a free end of said extension, said protractor including a base coupled to said free end of said extension, a pin being fixed on said base and extending upward therefrom, a follower having an opening engaged on said pin so that said follower is rotatable about said pin, a spring being biased between said follower and said base so as to bias said follower to rotate in one direction relative to said base, a graduation being provided on an upper edge of said follower, a mark being provided on said base; and
   when an object is disposed between said leg and said protractor, and when said vernier is pushed toward said object, said follower being caused to rotate about said pin so that a relative movement between said mark and said graduation indicates an angular dimension of said object.

2. A pair of vernier calipers according to claim 1, wherein a ridge is formed on an upper edge of said base and extends upward, said ridge has a curved lower surface whose curvature center is located at said pin, said mark is provided on said ridge, said upper edge of said follower is curved and has a curvature equal to that of said curved lower surface of said ridge so that said graduation can move relative to said mark when said follower rotates.

3. A pair of vernier calipers according to claim 2, wherein a screw hole is formed on an outer end of said ridge opposite to said leg of said scale body, a screw is threadedly engaged in said screw hole, a free end of said screw contacts said follower, a rotation of said screw makes said follower to rotate so that a zero degree line of said graduation can be aligned with said mark by adjusting said screw relative to said follower.

4. A pair of vernier calipers according to claim 1, wherein an annular recess is formed on a lower surface of said follower and is coaxial with said opening of said follower, said spring is a coil spring and is received in said annular recess, one end of said spring is engaged to said follower and the other end thereof is engaged to said base so that said follower is caused to rotate by said spring and said upper edge of said follower is caused to bear against said screw.

* * * * *